United States Patent
Kuo et al.

(10) Patent No.: US 7,535,510 B2
(45) Date of Patent: May 19, 2009

(54) FOCUS CONTROL APPARATUS FOR DIGITAL IMAGING DEVICE

(75) Inventors: Alex Kuo, Hsin Chu (TW); Franklin Lin, Taipei (TW); Yu-Yao Chang, Taipei (TW); Der-Jung Chen, Taipei (TW)

(73) Assignee: Starshine Technology Corp., Taipei (TW)

( * ) Notice: Subject to any disclaimer, the term of this patent is extended or adjusted under 35 U.S.C. 154(b) by 794 days.

(21) Appl. No.: 10/958,356

(22) Filed: Oct. 6, 2004

(65) Prior Publication Data

US 2005/0146633 A1    Jul. 7, 2005

(30) Foreign Application Priority Data

Jan. 6, 2004    (TW) .............. 93100274 A

(51) Int. Cl.
 *H04N 5/232* (2006.01)
 *H04N 5/228* (2006.01)
(52) U.S. Cl. .................... 348/345; 348/208.11
(58) Field of Classification Search ........... 348/357, 348/208.11, 208.13, 208.12, 204.1, 340, 348/326, 345
 See application file for complete search history.

(56) References Cited

U.S. PATENT DOCUMENTS 4,484,806 A * 11/1984 Onishi et al. ............... 348/350
5,838,374 A * 11/1998 Kikuchi ..................... 348/351
6,046,525 A *  4/2000 Shiozawa ................... 310/317
6,153,991 A * 11/2000 Burov et al. ................ 310/320
7,141,911 B2 * 11/2006 Kita et al. ................... 310/317
2004/0012305 A1 * 1/2004 Heilig et al. ............ 310/323.17

* cited by examiner

Primary Examiner—Nhan T Tran
Assistant Examiner—Mekonnen Dagnew
(74) Attorney, Agent, or Firm—Birch, Stewart, Kolasch & Birch, LLP

(57) ABSTRACT

A focus control apparatus controls a step motor and a piezoelectric material into order to control a focal distance between an electronic imaging device and a lens unit. The focus control apparatus has an image calculating unit for processing an image signal taken by the electronic imaging device into a resolution value, a displacement controlling unit receiving the resolution value in order to determine an optimal focal distance between the electronic imaging device and the lens unit and output a displacement controlling signal, a step motor controller and a piezoelectric material controller. The displacement controlling signal is supplied to the step motor controller or the piezoelectric material controller to control optimally the distance between an electronic imaging device and a lens unit.

11 Claims, 3 Drawing Sheets

FOCUS CONTROL APPARATUS FOR DIGITAL IMAGING DEVICE

This Nonprovisional application claims priority under 35 U.S.C. § 119(a) on Patent Application No(s). 093100274 filed in Taiwan, Republic of China on Jan. 6, 2004, the entire contents of which are hereby incorporated by reference.

BACKGROUND OF THE INVENTION

1. Field of the Invention

The present invention relates to a focus control apparatus for a digital imaging device, and especially to a focus control apparatus applicable to both step motor and piezoelectric material to control a distance between an electronic imaging device and a lens unit.

2. Description of Related Art

With the rapid progress of digital electronic and semiconductor process, many conventional consumer products have already been digitalized. For example, digital imaging devices such as digital still cameras (DSC) and digital video cameras (DV) are becoming more and more mature and popular.

The digital imaging device uses electronic imaging device such as CCD (charge coupled device) or CMOS (complementary metal oxide semiconductor) sensor instead of conventional film to obtain images. Moreover, a focusing unit is also essential for the performance of digital imaging device.

The present digital imaging device generally uses a lens unit controlled by a step motor to control the focusing of image. The step motor, based on a digital signal, controls the distance between the lens unit and the electronic imaging device for adjusting focus. However, the step motor is bulky, slow and expensive.

Alternatively, piezoelectric material such as piezoelectric ceramic can be used to implement a piezoelectric focusing unit for a digital imaging device. An electrical signal is applied to deform the piezoelectric material, so the distance between the lens unit and the electronic imaging device can be quickly adjusted. The distance for a focusing adjustment is generally a minute value. Therefore, the piezoelectric focusing unit is feasible, small, fast and cheap.

However, the piezoelectric material generally has a hysteretic response curve between driving force (electrical signal) and resulting deformation. The focus control apparatus for piezoelectric material is complicated in comparison with the focus control apparatus for step motor. Therefore, it is difficult to control the focusing action for both piezoelectric focusing device and step motor in the same digital imaging device simultaneously.

SUMMARY OF THE INVENTION

It is the object of the present invention to provide a focus control apparatus applicable to both a step motor and piezoelectric material to control a distance between an electronic imaging device and a lens unit.

To achieve the above object, the present invention provides a focus control apparatus for controlling a step motor and a piezoelectric material in order to control a focal distance between an electronic imaging device and a lens unit. The focus control apparatus comprises an image calculating unit for processing an image signal taken by the electronic imaging device into a resolution value, a displacement controlling unit receiving the resolution value in order to determine an optimal focal distance between the electronic imaging device and the lens unit, and outputting a displacement controlling signal, a step motor controller and a piezoelectric material controller. The displacement controlling signal is supplied to either the step motor controller or the piezoelectric material controller to control optimally the distance between an electronic imaging device and a lens unit.

In one aspect of the present invention, the displacement controlling unit comprises a storage sub-unit storing the resolution value for image signal calculated by the image calculating unit and corresponding distance, a comparison sub-unit comparing all resolution values for image signal to determine the optimal focal distance, and an output-conversion sub-unit generating a displacement controlling signal corresponding to the optimal focal distance.

In another aspect of the present invention, the displacement controlling signal is a digital signal for the step motor or a voltage signal for the piezoelectric material.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE INVENTION

Figure 1:
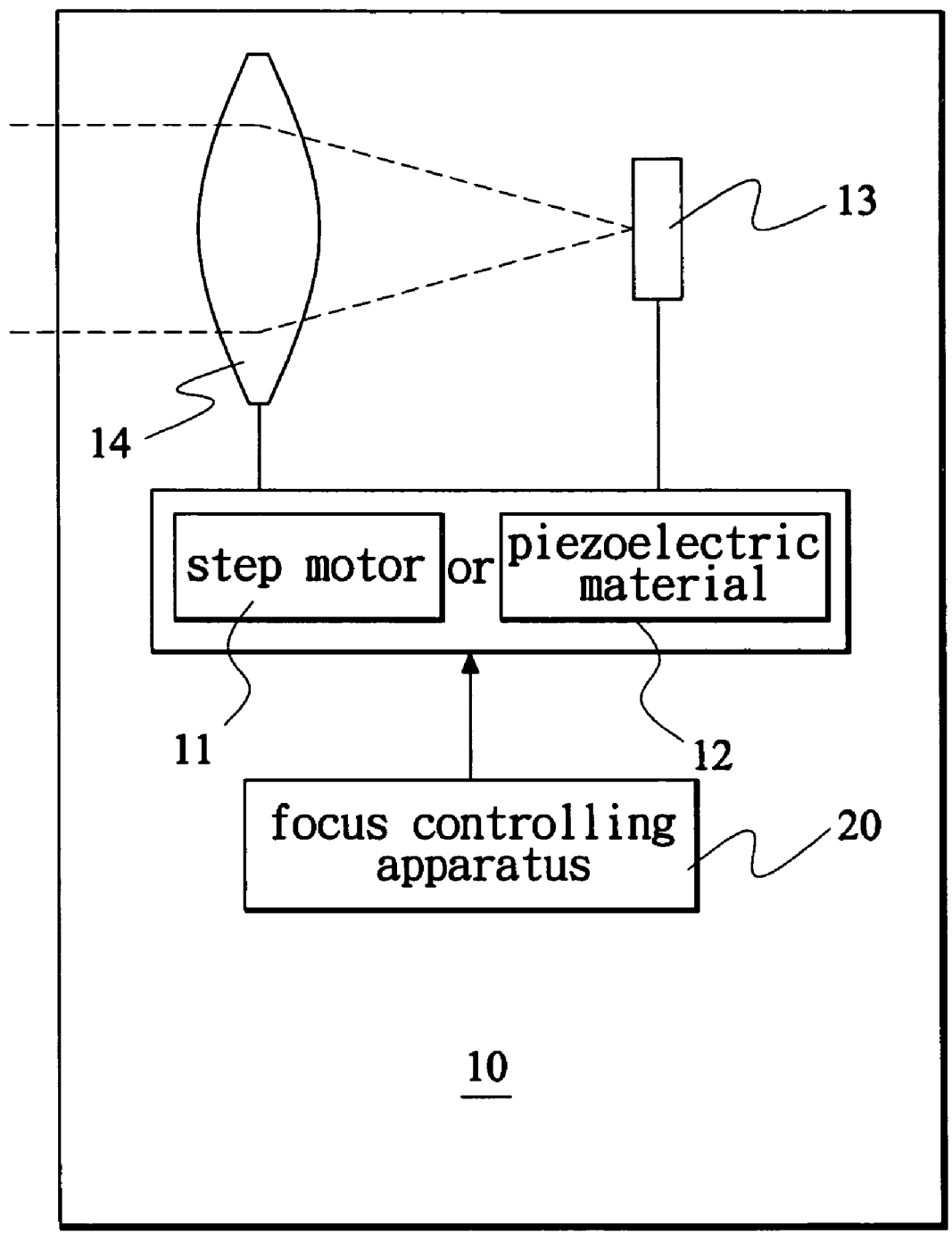
FIG. 1 shows a schematic diagram of a preferred embodiment according to the present invention.

FIG. 1 shows a schematic diagram of a preferred embodiment according to the present invention. The focus control apparatus 20 according to the present invention is employed for a digital imaging device 10. The digital imaging device 10 can be, for example, a digital still camera (DSC), a digital video camera (DV) or a scanner. In the demonstrated digital imaging device 10, a step motor 11 or a piezoelectric material 12 is employed for focus adjustment. The digital imaging device 10 further comprises an electronic imaging device 13 such as a CCD (charge coupled device) or CMOS sensor, and a lens unit 14 for focusing the image onto the electronic imaging device 13.

Figure 2:
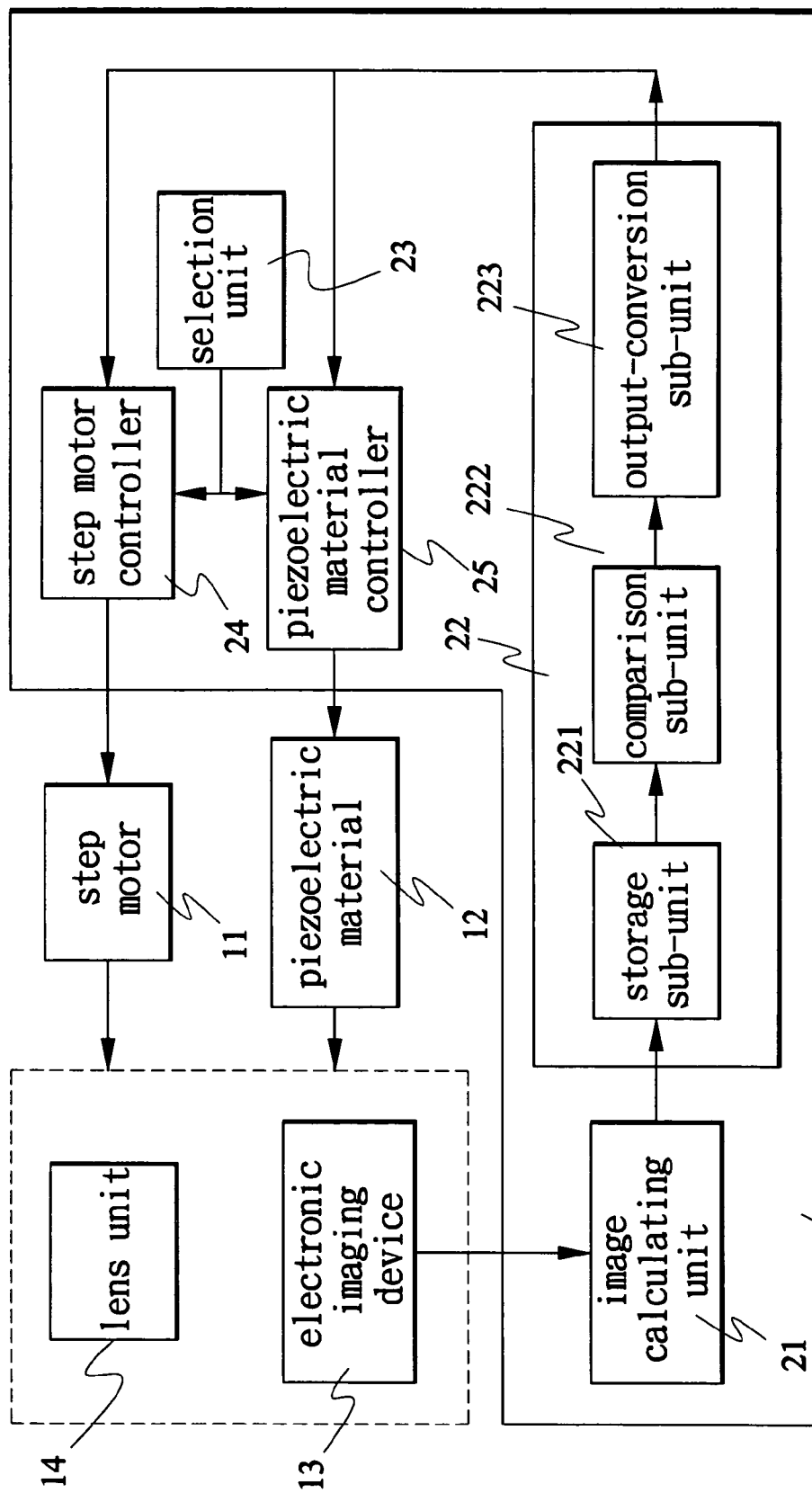
FIG. 2 shows the block diagram of the focus controlling apparatus according to the present invention.

FIG. 2 shows the block diagram of the focus control apparatus 20. The focus control apparatus 20 controls a distance between the electronic imaging device 13 and the lens unit 14 by adjusting either the step number of the step motor 11 or a deformation amount of the piezoelectric material 12. As shown in this figure, the focus control apparatus 20 comprises an image calculating unit 21, a displacement controlling unit 22, a selection unit 23, a step motor controller 24 and a piezoelectric material controller 25.

The image calculating unit 21 is electrically connected to the electronic imaging device 13 for processing an image signal taken by the electronic imaging device 13 into a resolution value. The displacement controlling unit 22 is electrically connected to the image calculating unit 21, and receives the resolution value in order to determine the optimal focal distance between the electronic imaging device 13 and the lens unit 14. The displacement controlling unit 22 generates a displacement controlling signal associated with the optimal focal distance and sends the displacement controlling signal to the step motor controller 24 or the piezoelectric material controller 25 for controlling the step motor 11 and the piezoelectric material 12, respectively.

The determination of optimal focal distance is made by repetitive computation conducted by the image calculating unit 21 and the displacement controlling unit 22. Moreover, the controlling IC for calculating the image resolution and for achieving quick focusing is also commercially available.

For example, a straightforward method calculates the image resolution for different distances between the electronic imaging device 13 and the lens unit 14, and then an optimal focal distance is determined by some optical algorithm such as bi-sectional method, fixed-distance comparison method or lookup table method.

The present invention uses above-mentioned optical algorithm for the image calculating unit 21 and the displacement controlling unit 22. Therefore, the displacement controlling unit 22 comprises a storage sub-unit 221, a comparison sub-unit 222 and an output-conversion sub-unit 223. The storage sub-unit 221 stores the resolution value for image signal calculated by the image calculating unit 21 and corresponding distance. The comparison sub-unit 222 compares all resolution values for image signal to determine the optimal focal distance. The output-conversion sub-unit 223 generates a displacement controlling signal corresponding to the optimal focal distance.

The focus control apparatus 20 according to the present invention has two controllers, namely, the step motor controller 24 and the piezoelectric material controller 25, and one of the two controllers is selected by the selection unit 23 as the primary controller. More particularly, the driving signal for the step motor controller 24 is digital signal and the driving signal for the piezoelectric material controller 25 is an analog signal. The selection unit 23 can be implemented by a selection switch or a jump pin.

If the step motor 11 is selected to provide displacement for a focusing action, then the step motor controller 24 is connected between the step motor 11 and the displacement controlling unit 22. The step motor controller 24 controls the driving step number of the step motor 11 after receiving the displacement controlling signal, thus, the optimal focal distance between the electronic imaging device 13 and the lens unit 14 can be achieved.

Figure 3:
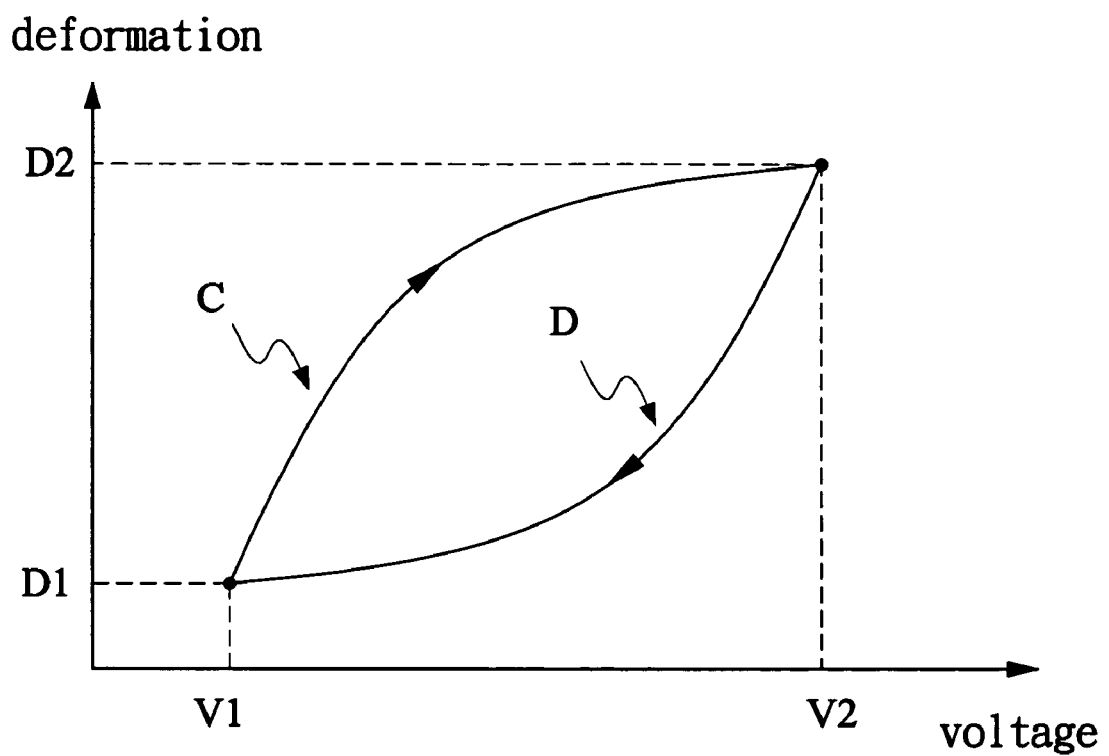
FIG. 3 shows the deformation verse driving force (electrical voltage signal) for the piezoelectric material according to the present invention.

The hysteretic response curve between the driving force (electrical voltage signal) and resulting deformation regarding the piezoelectric material should be noted. FIG. 3 shows deformation versus driving force (electrical voltage signal) for the piezoelectric material. In an expansion operation of the piezoelectric material, the piezoelectric material is driven by voltage increased from V1 to V2 along a forward path (curve C for expansion), and the piezoelectric material is deformed from deformation D1 to deformation D2. In a shrinkage operation of the piezoelectric material, the piezoelectric material is driven by voltage decreased from V2 to V1 along a backward path (curve D for shrinkage) different from the forward path, and the piezoelectric material is deformed from deformation D2 to deformation D1.

The piezoelectric material controller 25 is electrically connected between the piezoelectric material 12 and the displacement controlling unit 22. The piezoelectric material controller 25 receives the displacement controlling signal and then converts the displacement controlling signal into electrical voltage signal suitable for the piezoelectric material 12. Moreover, the piezoelectric material controller 25 also needs to judge whether the piezoelectric material 12 is operated at the expansion curve C or the shrinkage curve D. Afterward the piezoelectric material controller 25 will provide a suitable electrical voltage signal to the piezoelectric material 12 for achieving the optimal focal distance between the electronic imaging device 13 and the lens unit 14.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A focus control apparatus for controlling a step motor and a piezoelectric material in order to control a focal distance between an electronic imaging device and a lens unit, the focus control apparatus comprising:
   an image calculating unit electrically connected to the electronic imaging device for processing an image signal taken by the electronic imaging device into a resolution value;
   a displacement controlling unit electrically connected to the image calculating unit and receiving the resolution value in order to determine an optimal focal distance between the electronic imaging device and the lens unit and output a displacement controlling signal;
   a step motor controller electrically connected to the step motor and the displacement controlling unit, the step motor controller receiving the displacement controlling signal for driving a step number for the step motor;
   a piezoelectric material controller electrically connected to the piezoelectric material and the displacement controlling unit, the piezoelectric material controller receiving the displacement controlling signal for controlling a deformation of the piezoelectric material; and
   a selection unit electrically connected to the step motor controller and the piezoelectric material controller for selecting one of the step motor controller and the piezoelectric material controller to control a distance between the lens unit and the electronic imaging device,
   wherein, the displacement controlling signal is supplied to either the step motor controller or the piezoelectric material controller to control the optimal focal distance between the electronic imaging device and the lens unit.

2. The focus control apparatus as in claim 1, wherein the piezoelectric material is a deformable material with a hysteretic characteristic.

3. The focus control apparatus as in claim 1, wherein the piezoelectric material is expanded or shrunk according to a voltage applied thereon.

4. The focus control apparatus as in claim 1, wherein the electronic imaging device is one of CCD (charge coupled device) and CMOS sensor.

5. The focus control apparatus as in claim 1, wherein the selection unit is one of a selection switch and jump pin.

6. The focus control apparatus as in claim 1, wherein the image calculating unit receives an image signal corresponding to each distance between the lens unit and the electronic imaging device, calculates a resolution value with respect to the image signal, compares all resolution values and determines an optimal resolution value.

7. The focus control apparatus as in claim 1, wherein the displacement controlling unit comprises:
   a storage sub-unit storing the resolution value for image signal calculated by the image calculating unit and a corresponding distance;
   a comparison sub-unit comparing all resolution values for image signal to determine the optimal focal distance; and an output-conversion sub-unit generating a displacement controlling signal corresponding to the optimal focal distance.

8. The focus control apparatus as in claim 1, wherein the displacement controlling signal is a digital signal for the step motor.

9. The focus control apparatus as in claim 1, wherein the displacement controlling signal is a voltage signal for the piezoelectric material.

10. A focus control apparatus for controlling a step motor and a piezoelectric material in order to control a focal distance between an electronic imaging device and a lens unit, the focus control apparatus comprising:

an image calculating unit electrically connected to the electronic imaging device for processing an image signal taken by the electronic imaging device into a resolution value;

a displacement controlling unit electrically connected to the image calculating unit and receiving the resolution value in order to determine an optimal focal distance between the electronic imaging device and the lens unit and output a displacement controlling signal;

a step motor controller electrically connected to the step motor and the displacement controlling unit, the step motor controller receiving the displacement controlling signal for driving a step number for the step motor;

a piezoelectric material controller electrically connected to the piezoelectric material and the displacement controlling unit, the piezoelectric material controller receiving the displacement controlling signal for controlling a deformation of the piezoelectric material; and a selection unit electrically connected to the step motor controller and the piezoelectric material controller for selecting one of the step motor controller and the piezoelectric material controller to be a primary controller that generates a driving signal to control the distance between the lens unit and the electronic imaging device, wherein, the displacement controlling signal is supplied to either the step motor controller or the piezoelectric material controller to control the optimal focal distance.

11. The focus control apparatus as in claim 10, wherein the selection unit is one of a selection switch and a jump pin.

* * * * *